United States Patent
Lu

(10) Patent No.: US 7,334,138 B2
(45) Date of Patent: Feb. 19, 2008

(54) WINDOWS-DRIVEN POWER MANAGEMENT FOR PERIPHERAL DEVICES IN A COMPUTER SYSTEM

(75) Inventor: De-Jen Lu, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 467 days.

(21) Appl. No.: 10/982,777

(22) Filed: Nov. 8, 2004

(65) Prior Publication Data
US 2005/0120256 A1 Jun. 2, 2005

(30) Foreign Application Priority Data
Nov. 20, 2003 (TW) ............... 92132638 A

(51) Int. Cl.
*G06F 1/26* (2006.01)
*G06F 1/32* (2006.01)
(52) U.S. Cl. ............ 713/300; 713/320; 713/323; 713/324; 710/15; 710/18
(58) Field of Classification Search ........ 713/300, 713/320, 323
See application file for complete search history.

(56) References Cited

U.S. PATENT DOCUMENTS

| | | | | |
|---|---|---|---|---|
| 5,708,819 A | * | 1/1998 | Dunnihoo | ......... 713/323 |
| 5,752,050 A | * | 5/1998 | Hernandez et al. | ......... 713/330 |
| 5,758,175 A | * | 5/1998 | Fung | ......... 713/323 |
| 6,885,974 B2 | * | 4/2005 | Holle | ......... 702/182 |
| 7,093,141 B2 | * | 8/2006 | Elnozahy et al. | ......... 713/300 |
| 2003/0135769 A1 | * | 7/2003 | Loughran | ......... 713/310 |

* cited by examiner

Primary Examiner—Nititn C. Patel
(74) Attorney, Agent, or Firm—Pillsbury Winthrop Shaw Pittman, LLP

(57) ABSTRACT

An apparatus for dynamically managing the power consumption of peripheral devices in a computer includes at least one peripheral device, a power management unit, and a memory unit. The power management unit includes a daemon program and a device idle time table. The daemon program is used for carrying out a first criterion by determining whether the power supplied to the device is associated with an active application program of the computer based on the device idle time table, and carrying out a second criterion by determining whether the power supplied to the device is associated with the inactive application programs of the computer based on the device idle time table. A power-saving signal is sent to an operating system of the computer when both criteria are satisfied, and the operating system activates an embedded power management utility to turn off the peripheral device in response to the power-saving signal.

14 Claims, 3 Drawing Sheets

NIC

|          | ANSI C Compiler | Word Processor | Web Browser | Outlook Suite |
|----------|-----------------|----------------|-------------|---------------|
| Active   | 0               | 0              | 3 req/sec   | 1 min         |
| Inactive | 0               | 0              | 0           | 10 mins       |

HDD

|          | ANSI C Compiler | Word Processor | Web Browser | Outlook Suite |
|----------|-----------------|----------------|-------------|---------------|
| Active   | 2 req/sec       | 1 req/sec      | 3 req/sec   | 3 req/sec     |
| Inactive | 2 req/sec       | 15 mins        | 0           | 10 mins       |

Fig. 2B

WINDOWS-DRIVEN POWER MANAGEMENT FOR PERIPHERAL DEVICES IN A COMPUTER SYSTEM

FIELD OF THE INVENTION

The present invention relates to a technique for dynamically managing the power consumption of peripherals devices in a computer, and more particularly to a configuration and a method for dynamically managing the power consumption of peripheral devices in a computer based on the windows-based application programs for which the peripheral devices are possible to be driven by, so as to provide real-time change for the power consumption of peripheral devices in a computer.

BACKGROUND OF THE INVENTION

As computers and networks have grown in complexity and usefulness, businesses have become increasingly reliant on mobile computers and networks. Therefore, a failure in any particular computer may have a major impact on the productivity of a business.

The advanced power management (APM), which was published by Intel and Microsoft in 1992, defines various standard interfaces for power management of a computer. Using BIOS, the computer utilizes the APM to control and manage the power consumption for the peripheral devices. In a 16 bit/32 bit protected mode, the APM BIOS accounts for offering the subroutines used in the initialization of peripheral devices such as monitors, hard disks, floppy disks, main boards, and etc. In addition, a suitable function call table is established so as to directly control the power state of the hardware device by the operation system.

Since the APM system is mainly controlled by the BIOS and the power management function of the APM is limited, the APM system can achieve some simple power management control mechanisms, for example, powering off a given peripheral device attached to the computer after a predetermined time period (e.g. a break-even time of the peripheral device). Therefore, the power-saving efficiency of such power management system is not sufficient. On the other hand, after the computer is booted, the whole computer is dominated by the operation system, which is actually in communication with the peripheral devices. Accordingly, the control for the power management system should be transferred from the BIOS to the operation system so as to maximize the power-saving efficiency for the whole computer.

The Advanced Configuration and Power Management Interface (ACPI), which was published by Intel, Microsoft and Toshiba in Dec. 22, 1996, is a specification defining standard interfaces for hardware configuration and power management of a computer. According to the ACPI specification, the function of power management is integrated into the operation system so as to increase processing speed of the computer. This specification is also implemented on notebook computers, desktop computers, servers, etc.

During the operation phase of the ACPI, by means of ACPI driver, the operation system uses an AML interpreter to turn on/off the peripheral devices conforming to the ACPI specification. Alternatively, the peripheral devices are set to automatically turn on/off by the ACPI AML after a predetermined time period is reached. In the ACPI specification, there are two control methods to drive the CPU into a power management mode, one of which uses a system control interrupt (SCI) signal, and the other of which uses a complex table structure to directly enable the communications between the peripheral devices and the central processing unit (CPU).

Based on the objectives to which the power-saving method is to be applied, the ACPI specification defines four power modes from low to high, i.e. G (global mode), D (device mode), S (sleeping mode) and C (CPU mode). G states are system power states including G0, G1, G2/S5 and G3 states. G0 is the working state in which the CPU executes instructions and peripheral devices have their power states changed dynamically; when a peripheral device is not in use, it can enter into other power state. G1 is called the sleeping state in which no user mode threads are being executed and the system appears to be off state because the monitor is shut down. When a wakeup signal is triggered, the system resumes normal operation. G2/S5 is called the soft off state. In the G2/S5 state, the system consumes a minimal amount of power, and no user mode or system mode threads are running. Thus, it takes a prolonged time to resume the system. G3 is called the mechanical off state in which the power of the whole system is shut down and no current flows through the system. In the G3 state, the computer can only be restarted by turning on the power supply apparatus contained therein. D states are device power states including D0, D1, D2 and D3 states. D0 (fully on) is assumed to be the highest level of power consumption, and the peripheral devices are completely active under normal working. D1 offers slightly greater power saving than the D0 state. In the D2 state, some functions of the peripheral devices are forced to turn off and thus more power is saved. D3 is the off state in which the device power is fully shut down. When such device is used again, the device has to be reset. S states are sleeping states including S1, S2, S3, S4 and S5. S1 is a sleeping state in which the system can be resumed quickly and no system context is lost. S2 power state cuts power to the CPU and its cache. S3 power state shuts down almost everything except for the memory. S4 is known as a hibernation mode in which the entire system is stopped and all of the system contexts are stored to disk. In this state, the system reduces the power consumption to a minimum and the period for resuming the system operation is the longest. S5 is a soft off state that equals to G2 mode. In the S5 state, as similar to S4, the operation system does not hold any context. C states are CPU power states including C0, C1, C2 and C3. In the C0 state, the CPU executes instructions. The software in the C1 state is running normally with a shortest period for resuming the system operation. The C2 and the C3 states are low power states for the CPU, wherein C3 provides an improved power saving over C2.

When the system enters a power-saving mode, once an input/output device such as mouse or keyboard is activated, the system will generate a System Management Interrupt (SMI) signal to notify the CPU of the occurrence of a wakeup event. The clock of the CPU is then restored first. Then, the stored data is retrieved via BIOS and OS, and the interrupted working status is restored in response to a Removable Storage Manager (RSM) command.

ACPI provides a powerful power management system. Generally, the operating system, such as Microsoft WINDOWS determines the idle time of a peripheral device according to a time-out control policy. However, the power is wasted on providing electricity to the peripheral device during its idle time, and the time-out control policy is not able to efficiently power off the peripheral device during its idle time.

In view of the above-described disadvantages resulted from the conventional power management system, the applicant keeps on carving unflaggingly to develop a configuration and a method for dynamically managing the power consumption of peripheral devices through wholehearted experience and research.

SUMMARY OF THE INVENTION

It is an object of the present invention to provide a configuration and a method for dynamically managing the power consumption of peripheral devices in a computer based on the window-based application programs for which the peripheral devices are possible to be driven by, in order to provide real-time adaptation for the power consumption of peripheral devices. In this manner, the power status of the peripheral devices can be changed in good time, and the power consumption of the peripheral devices can be reduced significantly to achieve an efficient power management mechanism.

In accordance with a first aspect of the present invention, there is provided an apparatus for dynamically managing the power consumption of peripheral devices in a computer. The apparatus comprises at least one peripheral device, a power management unit, and a memory unit. The power management unit comprises a software routine and a database structure respectively including a daemon program and a device idle time table. The daemon program is used for carrying out a first criterion by determining whether the utilization of the peripheral device with respect to an active application program is zero based on the statistical data of the device idle time table (the active application program is the application program which executes in the only active window of the computer), and carrying out a second criterion by determining whether a minimum of the average idle times of the peripheral device with respect to the inactive application programs is longer than the break-even time of the peripheral device based on the device idle time table. The device idle time table is used for recording the average idle time of each peripheral device with respect to each application program of the computer. When both of the first criterion and the second criterion are satisfied, a power-saving signal is sent to the operating system of the computer. In response to the power-saving signal, the operating system powers off the peripheral device immediately without awaiting the expiration of the pre-determined device idle time.

In an embodiment, the peripheral device is an input/output device, for example a network card.

In an embodiment, the device is a data storage device, for example, a hard disk.

In accordance with a second aspect of the present invention, there is provided a method for dynamically managing the power consumption of peripheral devices in a computer. The method according to the present invention is accomplished by the steps of carrying out a first criterion by periodically determining whether the utilization of a peripheral device with respect to an active application program is zero, and carrying out a second criterion by determining whether a minimum of the average idle times of the peripheral device with respect to the inactive application programs is longer than the break-even time of the peripheral device. When both of the first criterion and the second criterion are satisfied, a power-saving signal is sent to the operating system of the computer. In response to the power-saving signal, the operating system activates an embedded power management utility to change the power status of the peripheral device.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 2B schematically illustrates an example of the device idle time table.

DETAILED DESCRIPTION OF THE PREFERRED EMBODIMENT

A conventional power management configuration may utilize a power management processor to calculate a predetermined idle time of a peripheral device so as to power off the peripheral device after the predetermined idle time is expired. However, such configuration needs to supply extra power to the power management processor and the device for performing the computation, so that it is difficult to determine the optimized idle time for the peripheral device and the criterion to power off the peripheral device.

Figure 1:
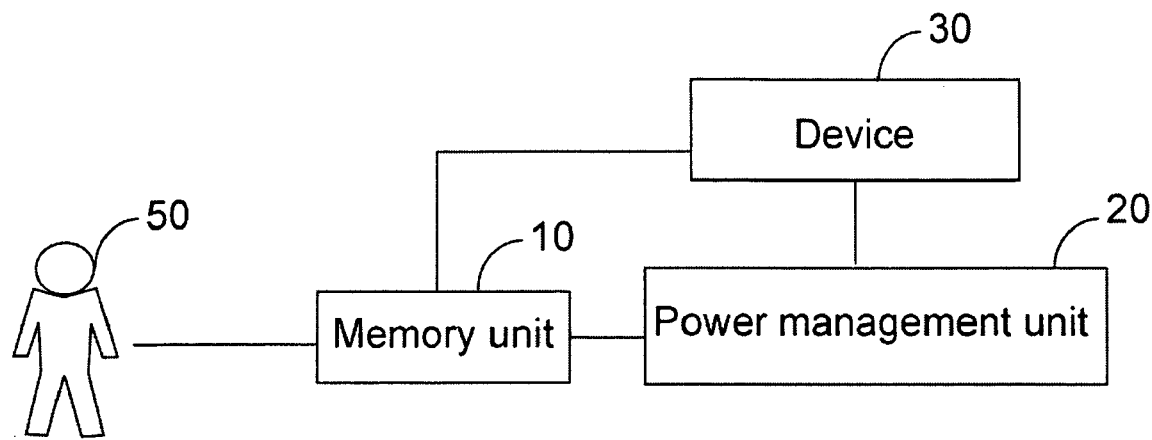
FIG. 1 is a block diagram illustrating an apparatus for dynamically managing the power consumption of peripheral devices according to a preferred embodiment of the present invention.

Referring to FIG. 1, a block diagram illustrating the configuration of an apparatus for dynamically managing the power consumption of peripheral devices according to a preferred embodiment of the present invention is shown. The apparatus comprises a memory unit 10, a power management unit 20, and at least one peripheral device 30. The power management unit 20 contains a software routine and a database structure that are used to carry out a first criterion and a second criterion for determining whether the power consumption of the peripheral devices with respect to the windows-based application programs running on a computer is optimized. The software routine and the data structure are launched and loaded in the memory unit 10 when they are put into execution, while their constitution and function will be described in more details in the following. When both of the first criterion and the second criterion are satisfied, the power management unit 20 then sends out a power-saving signal to the operating system of the computer. In response to the power-saving signal, the power status of the peripheral device 30 is changed by virtue of an embedded power management utility provided by the operating system. The peripheral device 30 can be an input/output device such as a network interface card, or a data storage device such as a hard disk.

When the first criterion is satisfied, the utilization of the peripheral device 30 with respect to an active application program of the computer is zero. In the contrast, when the second criterion is satisfied, a minimum of the average idle times of the peripheral device 30 with respect to the inactive application programs of the computer system is longer than the break-even time of the peripheral device 30.

Figure 2A:
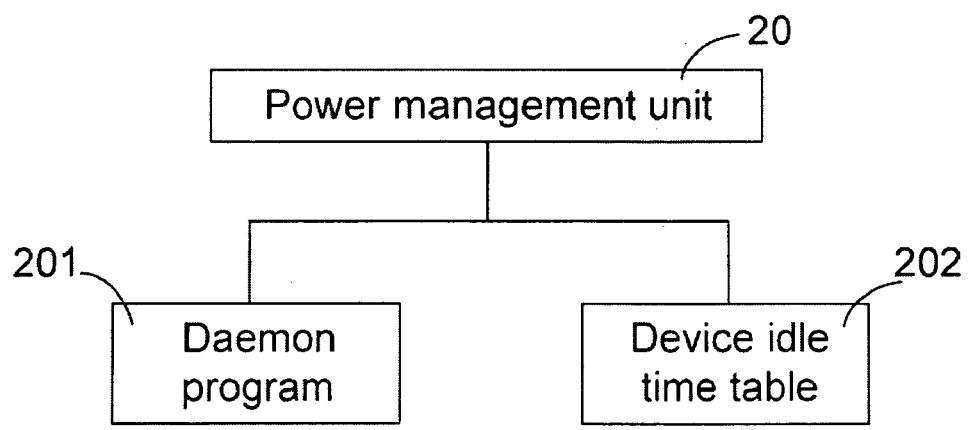
FIG. 2A schematically illustrates the composition of a power management unit according to the configuration of FIG. 1.

Referring to FIG. 2A, the composition of the power management unit 20 is illustrated. As shown in FIG. 2A, the software routine and the database structure constituting the power management unit 20 are embodied in a daemon program 201 and a device idle time table 202. The daemon program 101 is employed to determine whether both of the first criterion and the second criterion are satisfied. The device idle time table 202 is used for servicing the daemon program to carry out the first criterion and the second criterion. As to the format of the device idle time table 202, it will be explained below.

Referring to FIG. 2B, an illustrative device idle time table 202 is shown. The device idle time table 202 shown in FIG. 2B reveals the statistical data in relation to the average idle time of each peripheral device with respect to each application program running in the computer. In the present embodiment, the peripheral device is exemplified by a hard disk drive and a network interface card. As to the algorithm for carrying out the first criterion and the second criterion based on the statistical data of the device idle time table, an exemplary example will be given below in order to allow an artisan skilled in the art to fulfill the present invention in the light of the technique disclosed herein.

When the user 50 starts a computer, the daemon program 201 and the device idle time table 202 will be launched and loaded in the memory unit 10 for execution. The daemon program 201 will regularly update the device idle time table 202 and carry out the first criterion and the second criterion based on the statistical data revealed by the device idle time table to determine whether the peripheral device 30 should be powered off to conserve unnecessary power consumption. According to the determination results, a power-saving signal is sent to the operating system of the computer. In response to the power-saving signal, the operating system actives an embedded power management utility to power off the peripheral device 30.

Figure 3:
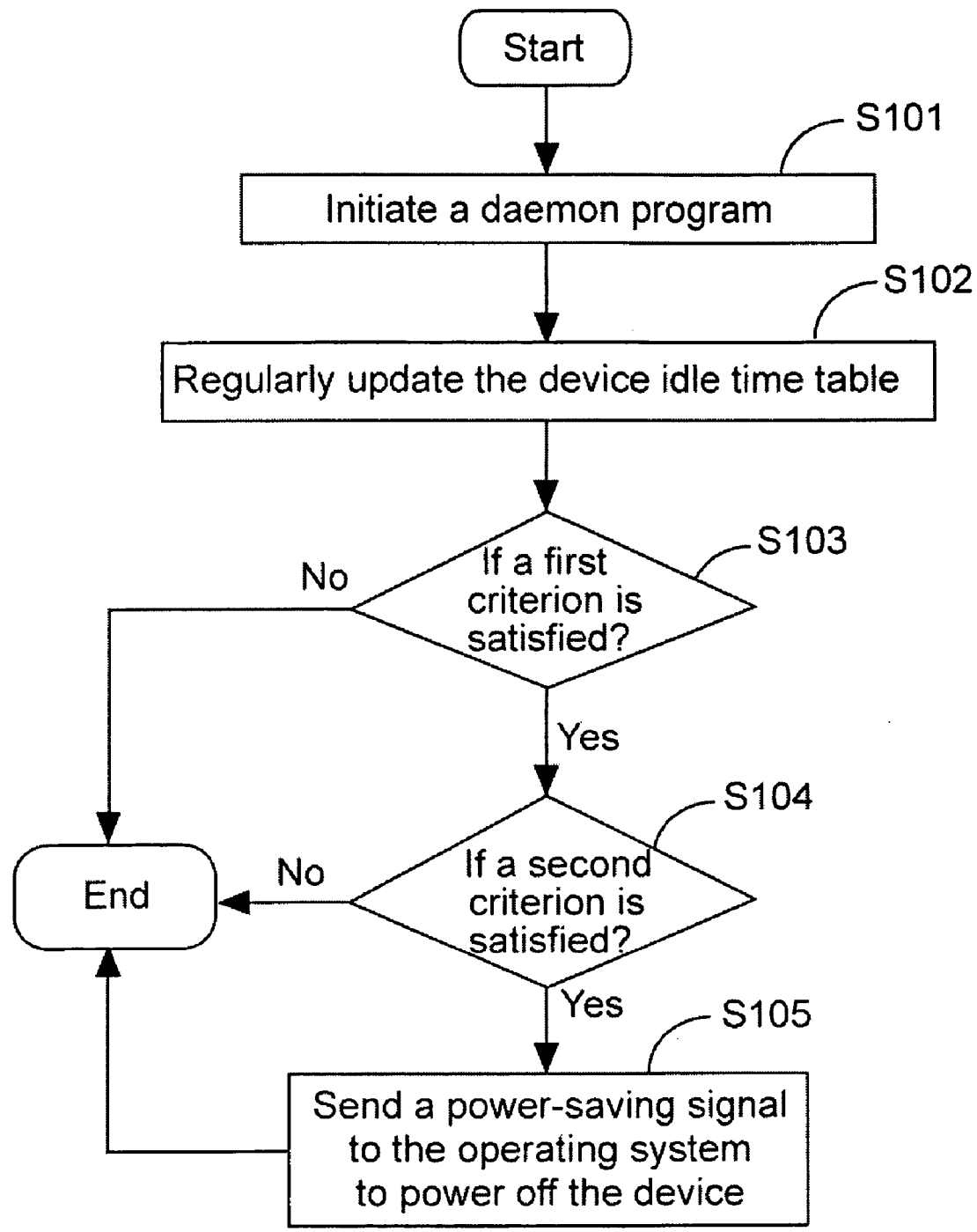
FIG. 3 is a flowchart illustrating a method for dynamically managing the power consumption of peripheral devices in a computer according to a preferred embodiment of the present invention.

In order to illustrate the method for dynamically managing the power consumption of peripheral devices in a computer in more details, a flowchart illustrating the steps of the windows-driven power management according to a preferred embodiment of the present invention is shown in FIG. 3. In step S101, a daemon program is initiated. Next, the daemon program will update the device idle time table regularly (step S102). Then, it is determined whether a first criterion is satisfied based on the statistical data in the device idle time table, i.e. whether the utilization of a peripheral device with respect to an active program is zero (step S103). If the first criterion is satisfied, the process continues with step S104. Next, it is determined whether a second criterion is satisfied, i.e. whether a minimum of the average idle times of the peripheral device with respect to the inactive application programs is longer than the break-even time of the peripheral device (step S104), wherein the average idle time of the peripheral, device is obtained from the statistical data provided by the device idle time table. If both of the first criterion and the second criterion are satisfied, a power-saving signal is sent to the operating system to power off the peripheral device (step S105).

The principle of the power management method and apparatus for optimizing the power consumption regulation for peripheral devices in a computer has been thoroughly explained without omission. Next, we are intended to give an exemplary example to dilate on the power management method for the peripheral devices in a computer. Referring to the device idle time table of FIG. 2B, assume there are four windows-based application programs currently running on a computer, including an ANSI C compiler, a word processor, a web browser, and an outlook suite. These application programs are driving and interacting with a hard disk drive (HDD) and a network interface card (NIC) fitted in the computer. The table shown in FIG. 2B specifies the statistical data of the device idle time associated with a hard disk drive and a network interface card with respect to each of the four application programs.

It is observable from the statistical data shown in Table 1 that in any case the ANSI C compiler and the word processor will not drive the network interface card, regardless of the activeness of these application programs. However, the web browser displaying non-dynamic HTML web pages will issue three requests to the network interface card per second when it is active, and will not drive the network interface card any more when it is inactive. Also, the outlook suite will issue one request to the network interface card per minute when it is active, and will issue a periodic request to the network interface card every ten minutes when it is inactive. Next, the interaction between the hard disk drive and the windows-based application programs will be taken in account. In this example the ANSI C compiler will issue two requests to the hard disk drive per second in both the active and inactive mode. The word processor will issue one request to the hard disk drive per second when it is active, and will issue a period request to the hard disk drive every fifteen minutes when it is inactive. The web browser will issue three requests to the hard disk drive per second while it is active, and will not drive the hard disk drive while it is inactive. The outlook suite will issue three requests to the hard disk drive per second while it is active, and will issue a period request to the hard disk drive every ten minutes when it is inactive.

Suppose the web browser is active in the windows-based operating system and the other three application programs are inactive, and the break-even time of the network interface card is 3 minutes. In this case, the web browser issues three requests to the network interface card per second and the outlook suite issues a periodic request to the network interface card every ten minutes. If the computer user switches the active application program from the web browser to the ANSI C compiler, the daemon program according to the present invention may determine that the next periodic request issued by the outlook suite comes later than 3 minutes. That is, the daemon program first carries out the first criterion by determining if the utilization of the peripheral device with respect to the active application program is zero. In the present example, the utilization of the network interface card with respect to the active ANSI C compiler is zero, which indicates the first criterion is satisfied. Next, the daemon program then carries out the second criterion by determining if the average device idle time of the peripheral device with respect to the inactive application programs is longer than the break-even time of the peripheral device. In the present example, the word processor and the web browser will not drive the network interface card when they are inactive, and the average idle time of the network interface card with respect to the word processor and the web browser under this condition will be infinite. Also, the next periodic request issued by the outlook suite to the network interface card comes in ten minutes. That indicates the average idle time of the network interface card with respect to all of the inactive application programs is at least ten minutes, which is longer than the break-even time of the network interface card (3 minutes). This indicates the second criterion is also satisfied. In this way, the daemon program can issue a power-saving signal to the operating system to shut down the network interface card, and thereby improving the efficiency of the power consumption regulation for the network interface card.

From the above description, the apparatus and the power management method of the present invention are capable of dynamically managing the power consumption of peripheral devices by periodically determining whether the utilization of a peripheral device with respect to an active application program is zero, or whether a minimum of the average idle times of the peripheral device with respect to the inactive application programs is longer than the break-even time of the peripheral device, so as to provide real-time change of power status of the peripheral device and reduce the power consumption of the peripheral device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for dynamically managing a power consumption of peripheral devices in a computer, comprising:
    at least one peripheral device;
    a memory unit; and
    a power management unit, comprising:
        a device idle time table for recording the an average idle time of each peripheral device with respect to each application program in the computer; and
        a daemon program being launched and loaded in the memory unit for carrying out a first criterion by determining whether the power supplied to a peripheral device is associated with an active application program running on said computer based on a statistical data of said device idle time table, and carrying out a second criterion by determining whether the power supplied to said peripheral device is associated with an inactive application programs running on said computer based on the statistical data of said device idle time table, and, wherein a power-saving signal is sent to an operating system of the computer when both of said first criterion and said second criterion are satisfied, and in response to said power-saving signal, said operating system powers off said peripheral device.

2. The apparatus for dynamically managing the power consumption of peripheral devices in a computer according to claim 1, wherein said first criterion is satisfied when the utilization of said peripheral device with respect to an active application program is zero.

3. The apparatus for dynamically managing the power consumption of peripheral devices in a computer according to claim 1, wherein said second criterion is satisfied when a minimum of average idle times of said peripheral device with respect to said inactive application programs is longer than a break-even time of said peripheral device.

4. The apparatus for dynamically managing the power consumption of peripheral devices in a computer according to claim 1, wherein said peripheral device is an input/output device.

5. The apparatus for dynamically managing the power consumption of peripheral devices in a computer according to claim 1, wherein said input/output device is a network interface card.

6. The apparatus for dynamically managing the power consumption of peripheral devices in a computer according to claim 5, wherein said peripheral device is a data storage device.

7. The apparatus for dynamically managing the power consumption of peripheral devices in a computer according to claim 6, wherein said data storage device is a hard disk.

8. A method for dynamically managing a power consumption of peripheral devices in a computer, comprising:
    carrying out a first criterion by determining whether the power supplied to a peripheral device is associated with an active application program running in said computer;
    carrying out a second criterion by determining whether the power supplied to said peripheral device is associated with an inactive application program running in said computer;
    sending a power-saving signal to an operating system of said computer unit when both of said first criterion and said second criterion are satisfied; and
    in response to said power-saving signal, powering off said peripheral device.

9. The method for dynamically managing the power consumption of peripheral devices in a computer according to claim 8, wherein said first criterion is satisfied when the utilization of said peripheral device with respect to said active application program is zero.

10. The method for dynamically managing the power consumption of peripheral devices in a computer according to claim 8, wherein said second criterion is satisfied when a minimum of average idle times of said peripheral device with respect to said inactive application programs is longer than the a break-even time of said peripheral device.

11. The method for dynamically managing the power consumption of peripheral devices in a computer according to claim 8, wherein said peripheral device is an input/output device.

12. The method for dynamically managing the power consumption of peripheral devices in a computer according to claim 11, wherein said input/output device is a network interface card.

13. The method for dynamically managing the power consumption of peripheral devices in a computer according to claim 8, wherein said peripheral device is a data storage device.

14. The method for dynamically managing the power consumption of peripheral devices in a computer according to claim 13, wherein said data storage device is a hard disk.

* * * * *